(12) United States Patent
Matsushita et al.

(10) Patent No.: US 12,271,776 B2
(45) Date of Patent: Apr. 8, 2025

(54) READER APPARATUS AND CONTROL METHOD WITH CANCELATION CIRCUIT

(71) Applicant: TOSHIBA TEC KABUSHIKI KAISHA, Tokyo (JP)

(72) Inventors: Naohiro Matsushita, Mishima Shizuoka (JP); Sadatoshi Oishi, Fuji Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/991,562

(22) Filed: Nov. 21, 2022

(65) Prior Publication Data

US 2023/0367981 A1    Nov. 16, 2023

(30) Foreign Application Priority Data

May 11, 2022    (JP) .................. 2022-078224

(51) Int. Cl.
*G06K 7/10* (2006.01)
*H04B 1/04* (2006.01)
*H04L 25/49* (2006.01)

(52) U.S. Cl.
CPC .......... *G06K 7/10009* (2013.01); *H04B 1/04* (2013.01); *H04L 25/49* (2013.01)

(58) Field of Classification Search
CPC ....... G06K 7/10009; H04B 1/04; H04L 25/49
See application file for complete search history.

(56) References Cited

U.S. PATENT DOCUMENTS

2007/0018792 A1    1/2007    Taki et al.
2010/0214071 A1*   8/2010    Nagai ............... G06K 7/0008
                                                340/10.1

* cited by examiner

*Primary Examiner* — Daniell L Negron
(74) *Attorney, Agent, or Firm* — FOLEY & LARDNER LLP

(57) ABSTRACT

A reader apparatus includes a transmission circuit, a cancellation circuit, and a decoding circuit. The transmission circuit is configured to transmit a query wave that is obtained by modulating a carrier wave with a modulation signal representing a command to be transmitted to a first responder. The cancellation circuit is configured to cancel a modulation component corresponding to the modulation signal from a response wave transmitted using a backscattering method from a second responder different from the first responder. The decoding circuit is configured to decode data represented by the response wave from which the modulation component is canceled by the cancellation circuit.

14 Claims, 5 Drawing Sheets

READER APPARATUS AND CONTROL METHOD WITH CANCELATION CIRCUIT

CROSS-REFERENCE TO RELATED PATENT APPLICATION

This application is based upon and claims the benefit of priority from Japanese Patent Application No. 2022-078224, filed May 11, 2022, the entire contents of which are incorporated herein by reference.

FIELD

Embodiments described herein relate generally to a reader apparatus.

BACKGROUND

Wireless tags are roughly classified into reader talk first (RTF) tags and tag talk first (TTF) tags. The RTF tag responds to a command in a modulated portion of a radio wave that is transmitted from a reader, for example, according to standards such as EPC Global Gen 2. If a radio wave transmitted from a reader is received, the TTF tag backscatters a response by detecting the incoming radio wave irrespective of whether the radio wave is modulated.

Therefore, if a reader transmits a command to read the RTF tag present near the TTF tag, the TTF tag may also respond to the command. Therefore, by setting the TTF tag for FM0 response and setting the RTF tag for mirror subcarrier response, a response wave from the TTF tag and a response wave from the RTF tag can be made to be different in frequency band such that each of the response waves can be extracted by a filter.

However, amplitude shift keying (ASK) is used to wirelessly transmit a command for reading the RTF tag. Therefore, a response wave from the TTF tag in a period where a reader is transmitting a command includes an ASK modulated wave component, and there is no guarantee that the response data can be appropriately decoded. Accordingly, the reader ignores a response from the TTF tag while reading the RTF tag. That is, if the reader sets both of the RTF tag and the TTF tag as reading targets, a period where the RTF tag is read and a period where the TTF tag is read need to be set to be different, and a period of time required to read both of the tags increases.

Under these circumstances, it is desired that the period of time required to read two types of responders such as the RTF tag and the TTF tag can be reduced.

DETAILED DESCRIPTION

Embodiments provide a communication apparatus that can reduce a period of time required to read two types of responders.

In general, according to one embodiment, a reader apparatus includes a transmission unit, a cancellation unit, and a decoding unit. The transmission unit is configured to transmit a query wave that is obtained by modulating a carrier wave with a modulation signal representing a command to be transmitted to a first responder. The cancellation unit is configured to cancel a modulation component corresponding to the modulation signal from a response wave transmitted using a backscattering method from a second responder different from the first responder. The decoding unit is configured to decode data represented by the response wave from which the modulation component is canceled by the cancellation unit.

Hereinafter, an embodiment will be described using the drawings. Hereinafter, a reader apparatus that reads data stored in an RFID tag will be described as an example.

Figure 1:
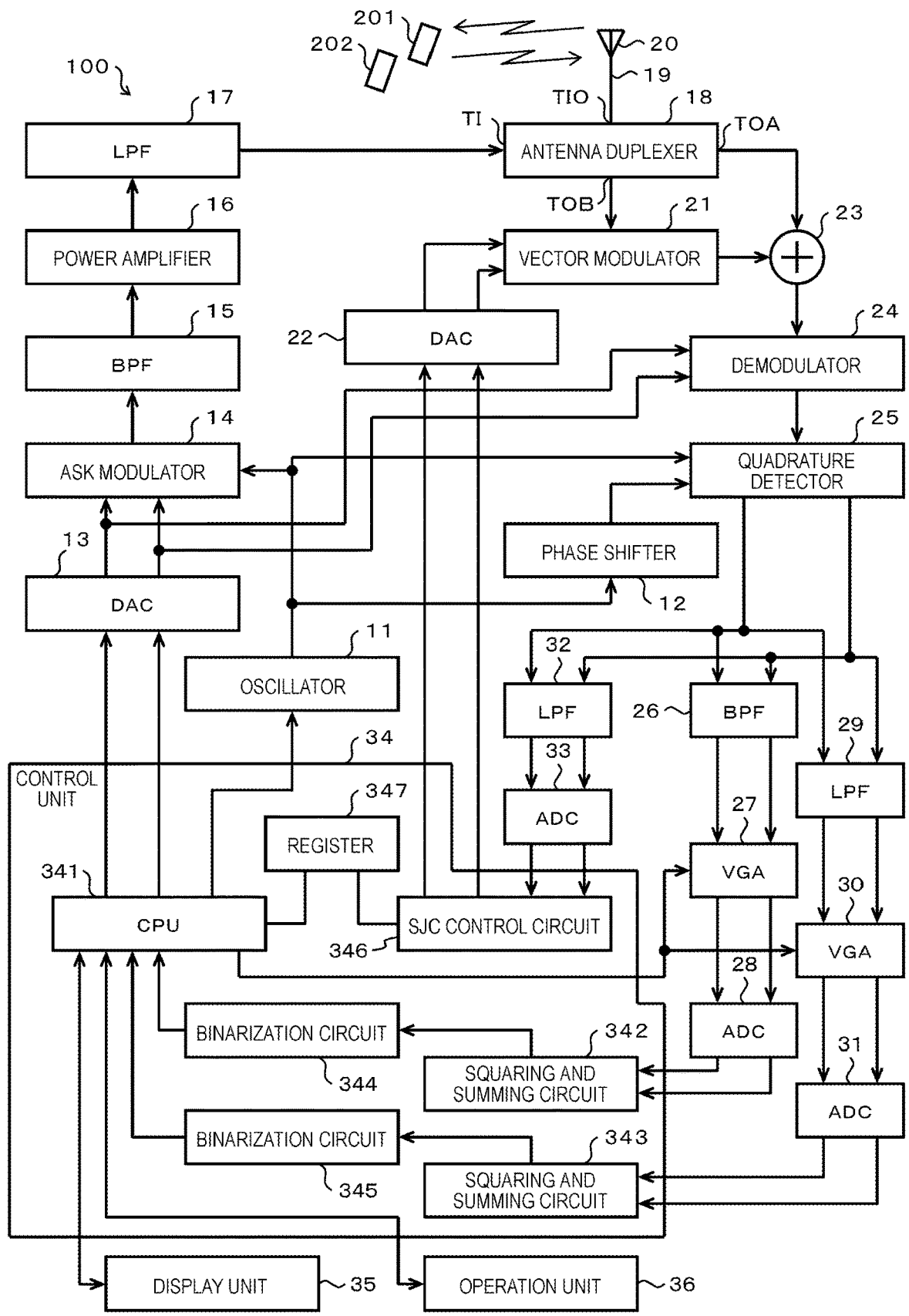
FIG. 1 is a block diagram illustrating a main circuit configuration of a reader apparatus according to one embodiment.

FIG. 1 is a block diagram illustrating a main circuit configuration of a reader apparatus 100 according to the embodiment.

The reader apparatus 100 reads data stored in radio frequency identification (RFID) tags 201 and 202.

The RFID tag 201 is a RTF tag. The RFID tag 202 is a TTF tag. Accordingly, hereinafter, if it is necessary to distinguish between the RTF tag and the TTF tag, "RTF tag 201" and "TTF tag 202" are used, and if it is not necessary to distinguish between the RTF tag and the TTF tag, "RFID tags 201 and 202" are used. The RTF tag is an example of the first responder. The TTF tag 202 is an example of the second responder.

The reader apparatus 100 includes an oscillator 11, a phase shifter 12, a digital to analog converter (DAC) 13, an ASK modulator 14, a band-pass filter (BPF) 15, a power amplifier 16, a low-pass filter (LPF) 17, an antenna duplexer 18, a feeder 19, an antenna 20, a vector modulator 21, a DAC 22, a power combiner 23, a demodulator 24, a quadrature detector 25, a band-pass filter (BPF) 26, a variable-gain amplifier (VGA) 27, an analog to digital converter (ADC) 28, an LPF 29, a VGA 30, an ADC 31, an LPF 32, an ADC 33, a control unit 34 (a controller), a display unit 35 (a display), and an operation unit 36 (user interface, operator input, etc.). Instead of the antenna 20 being included in the reader apparatus 100, any antenna can also be connected to the feeder 19. In addition, instead of the antenna 20 and the feeder 19 being included in the reader apparatus 100, any feeder connected to any antenna can also be connected to the antenna duplexer 18.

Typically, the reader apparatus 100 is implemented as a single apparatus including all of the components. However, the reader apparatus 100 may be implemented by connecting a plurality of apparatuses where the components are distributed and mounted in a wired or wireless manner. Examples of the latter configuration include a configuration where a mobile information terminal including the control unit 34, the display unit 35, and the operation unit 36 is connected to a communication unit where the other components are mounted.

The oscillator 11 generates a sine wave having a predetermined frequency as a carrier wave.

The phase shifter 12 shifts the phase of the carrier wave generated by the oscillator 11 by 90 degrees to output a cosine wave as another carrier wave.

The DAC 13 converts a quadrature transmission baseband signal in a digital format output from the control unit 34 into a signal in an analog format.

The ASK modulator 14 changes the amplitude of the carrier wave generated by the oscillator 11 to obtain an ASK-modulated transmission signal. In the embodiment, the ASK modulator 14 is configured using a quadrature modulation circuit. By transmitting a quadrature transmission baseband signal to the quadrature modulation circuit from the control unit 34 via the DAC 13 so as to cause only a change in amplitude without causing a frequency shift, an ASK-modulated transmission signal is obtained.

The BPF 15 removes a low-frequency component and a high-frequency component for band limitation from the transmission signal obtained by the ASK modulator 14.

The power amplifier 16 amplifies the transmission signal transmitted through the BPF 15 up to a level suitable for wireless transmission.

The LPF 17 removes a harmonic component from the transmission signal amplified by the power amplifier 16.

The antenna duplexer 18 includes an input terminal TI, an input/output terminal TIO, an output terminal TOA, and an output terminal TOB. The transmission signal transmitted through the LPF 17 is input to the input terminal TI. The antenna duplexer 18 outputs the transmission signal input to the input terminal TI from the input/output terminal TIO and the output terminal TOB. The antenna duplexer 18 outputs the signal input to the input/output terminal TIO from the output terminal TOA. The signal output from the output terminal TOA of the antenna duplexer 18 is a signal where a reception signal generated by the antenna 20 and a self-interference signal are combined. Hereinafter, this signal will be referred to as "reception signal".

The feeder 19 supplies the transmission signal output from the input/output terminal TIO of the antenna duplexer 18 to the antenna 20. The feeder 19 transmits the reception signal generated by the antenna 20 to the input/output terminal TIO of the antenna duplexer 18.

The antenna 20 emits a radio wave corresponding to the transmission signal supplied by the feeder 19. The antenna 20 generates an electrical signal corresponding to an incoming radio wave as a reception signal.

The vector modulator 21 modulates the transmission signal output from the output terminal TOB of the antenna duplexer 18 into a signal having an amplitude and a phase corresponding to a vector represented by quadrature control signals (hereinafter, referred to as an I control signal and a Q control signal) from the DAC 22. Hereinafter, the transmission signal modulated by the vector modulator 21 will be referred to as a cancellation signal.

The DAC 22 converts the I control signal and the Q control signal in a digital format output from the control unit 34 into an I control signal and a Q control signal in an analog format to be supplied to the vector modulator 21.

The power combiner 23 combines the cancellation signal output from the vector modulator 21 with the reception signal output from the output terminal TOA of the antenna duplexer 18. As a result, the power combiner 23 reduces the self-interference signal in the reception signal.

Each of the I and Q quadrature baseband signals input to the ASK modulator 14 is input to the demodulator 24. The demodulator 24 demodulates the reception signal output from the power combiner 23 with the modulated wave.

The quadrature detector 25 detects the reception signal demodulated by the demodulator 24 using two carrier waves having a phase difference of 90 degrees that are output from the oscillator 11 and the phase shifter 12, respectively. The quadrature detector 25 outputs the reception baseband signals in an analog format obtained by the quadrature detection in parallel.

The BPF 26 extracts a component in a predetermined frequency band from each of the reception baseband signals output from the quadrature detector 25. The passband of the BPF 26 is a frequency band that is predetermined for mirror subcarrier response. That is, the BPF 26 extracts signals corresponding to the response wave from the RTF tag 201 from the reception baseband signals.

The VGA 27 amplifies each of the reception baseband signals transmitted through the BPF 26 by a gain instructed by the control unit 34 so as to obtain a level suitable for the digitization by the ADC 28.

The ADC 28 converts the reception baseband signals amplified by the VGA 27 into signals in a digital format.

Thus, the BPF 26, the VGA 27, and the ADC 28 configure a processing system of the reception baseband signals corresponding to the response wave from the RTF tag 201.

The LPF 29 extracts a component in a predetermined frequency band from each of the reception baseband signals output from the quadrature detector 25. The passband of the LPF 29 is a frequency band that is predetermined for FM0 response. That is, the BPF 26 extracts signals corresponding to the response wave from the TTF tag 202 from the reception baseband signals.

The VGA 30 amplifies each of the reception baseband signals transmitted through the LPF 29 by a gain instructed by the control unit 34 so as to obtain a level suitable for the digitization by the ADC 31.

The ADC 31 converts the reception baseband signals amplified by the VGA 30 into signals in a digital format.

Thus, the LPF 29, the VGA 30, and the ADC 31 configure a processing system of the reception baseband signals corresponding to the response wave from the TTF tag 202.

The LPF 32 extracts a low frequency band corresponding to the component of the self-interference signal in each of the reception baseband signal output from the quadrature detector 25. The signals extracted by the LPF 32 include the component of the self-interference signal remaining in the output of the power combiner 23. Hereinafter, the signals extracted by the LPF 32 will be referred to as an I residual signal and a Q residual signal.

The ADC 33 converts the I residual signal and the Q residual signal output from the LPF 32 into signals in a digital format.

Thus, the LPF 32 and the ADC 33 configure a processing system of the self-interference signal.

The control unit 34 includes a central processing unit (CPU) 341, squaring and summing circuits 342 and 343, binarization circuits 344 and 345, an SJC control circuit 346, and a register 347.

The CPU 341 outputs a transmission baseband signal according to a predetermined sequence during communication with the RTF tag 201. The CPU 341 reconstructs data transmitted from the RTF tag 201 based on a reception signal output from the binarization circuit 344. The CPU 341 reconstructs data transmitted from the TTF tag 202 based on a reception signal output from the binarization circuit 345.

The squaring and summing circuit 342 squares the individual reception baseband signals output from the ADC 28, sums up the squares, and outputs the summation result. The squaring and summing circuit 343 squares the individual reception baseband signals output from the ADC 31, sums up the squares, and outputs the summation result.

The binarization circuit 344 binarizes the output value from the squaring and summing circuit 343 with a predetermined threshold. The binarization circuit 345 binarizes the output value from the squaring and summing circuit 343 with a predetermined threshold.

The SJC control circuit 346 controls the vector modulator 21 for self-jammer cancellation (SJC) to cancel the self-interference signal. For example, the SJC control circuit 346 determines an amplitude and a phase of the cancellation signal for reducing the self-interference signal based on the I residual signal and the Q residual signal output from the ADC 33, and transmits the I control signal and the Q control signal to the vector modulator 21 so as to output the cancellation signal having the amplitude and the phase.

The register 347 temporarily stores various data transmitted and received between the CPU 341 and the SJC control circuit 346 for the SJC process.

The display unit 35 displays various information to be notified to a user, for example, the reading results of the RFID tags 201 and 202 under the control of the CPU 341.

The operation unit 36 inputs various instructions by the user regarding the operation of the reader apparatus 100 and notifies the CPU 341 of the contents of the instructions.

Figure 2:
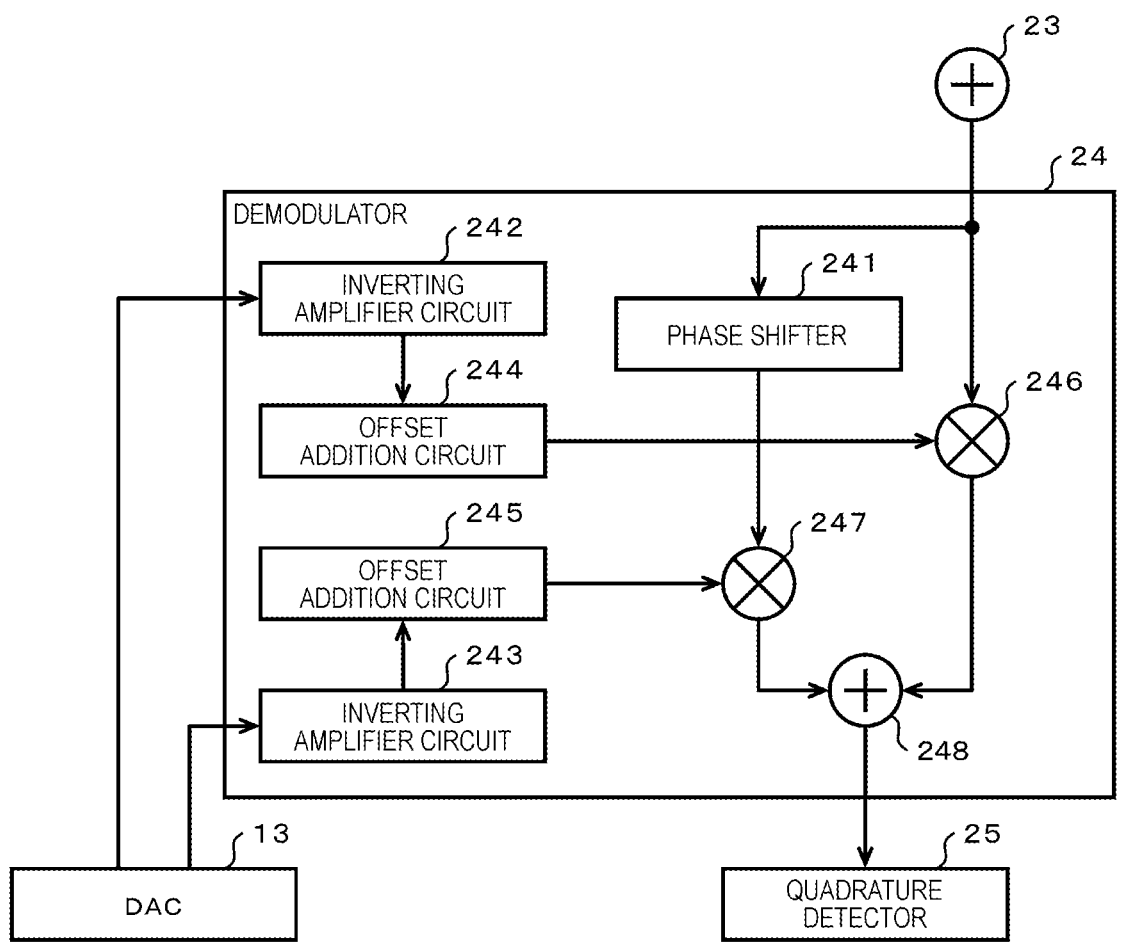
FIG. 2 is a block diagram illustrating a configuration example of a demodulator in FIG. 1.

FIG. 2 is a block diagram illustrating a configuration example of the demodulator 24.

The demodulator 24 includes a phase shifter 241, inverting amplifier circuits 242 and 243, offset addition circuits 244 and 245, accumulation circuits 246 and 247, and a summing circuit 248.

The reception signals output from the power combiner 23 are input to the phase shifter 241. The phase shifter 241 shifts the phases of the input reception signals from each other by 90 degrees.

An I modulation signal output from the DAC 13 is input to the inverting amplifier circuit 242. A Q modulation signal output from the DAC 13 is input to the inverting amplifier circuit 243. The inverting amplifier circuits 242 and 243 adjusts the amplitude of each of the input modulation signals while inverting the polarity thereof.

The I modulation signal output from the inverting amplifier circuit 242 is input to the offset addition circuit 244. The Q modulation signal output from the inverting amplifier circuit 243 is input to the offset addition circuit 245. The offset addition circuits 244 and 245 sums predetermined offset values to the input I modulation signal and the input Q modulation signal such that offset components generated in the I modulation signal and the Q modulation signal are canceled out with offset voltages of the inverting amplifier circuits 242 and 243.

The reception signal output from the power combiner 23 and the I modulation signal output from the offset addition circuit 244 are input to the accumulation circuit 246. The reception signal output from the phase shifter 241 and the Q modulation signal output from the offset addition circuit 245 are input to the accumulation circuit 247. Each of the accumulation circuits 246 and 247 accumulates the I modulation signal or the Q modulation signal to the input reception signal.

The summing circuit 248 sums up the outputs of the accumulation circuits 246 and 247. The output of the summing circuit 248 is input to the quadrature detector 25 as the output of the demodulator 24.

Next, an operation of the reader apparatus 100 configured as described above will be described.

If the RTF tag 201 is read, the CPU 341 changes the transmission baseband signal that is output to the DAC 13 so as to change the transmission signal according to a predetermined sequence. Various sequences for reading the RTF tag 201 are known, and any one of the sequences may be used. Hereinafter, a specific example where EPC Global Gen 2 is applied will be described.

Figure 3:
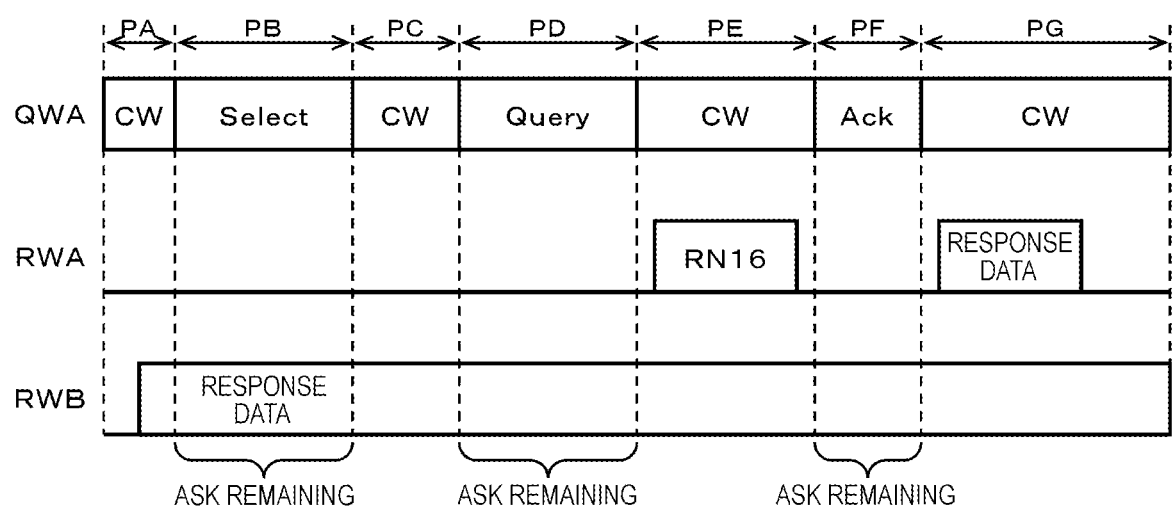
FIG. 3 is a diagram illustrating a state of a radio wave transmitted and received for reading an RTF tag.

FIG. 3 is a diagram illustrating a state of a radio wave transmitted and received for reading the RTF tag 201.

QWA in FIG. 3 represents a change in the state of a radio wave (hereinafter, referred to as a query wave) emitted from the antenna 20 if the CPU 341 changes the transmission baseband signal as described above. RWA represents a change in the state of the response wave from the RTF tag 201 depending on the query wave. RWB represents a change in the state of the response wave from the TTF tag 202 depending on the query wave.

A query wave in a period PA is an unmodulated carrier wave (CW). A query wave in a period PB is ASK-modulated with a modulation signal representing a Select command. A query wave in a period PC is an unmodulated carrier wave. A query wave in a period PD is ASK-modulated with a modulation signal representing a Query command. A query wave in a period PE is an unmodulated carrier wave. A query wave in a period PF is ASK-modulated with a modulation signal representing an Ack command. A query wave in a period PG is an unmodulated carrier wave.

The query wave is transmitted from the antenna 20 if the transmission signal obtained by performing various processes on the transmission baseband signal changed by the CPU 341 in the DAC 13, the ASK modulator 14, the BPF 15, the power amplifier 16, the LPF 17, and the antenna duplexer 18 is supplied to the antenna 20 through the feeder 19. Thus, these units implement a function as a transmission unit or circuit that transmits a query wave representing a command to be transmitted to the RTF tag 201 as the first responder.

If the RTF tag 201 corresponds to a tag that is designated by the Select command, the RTF tag 201 backscatters RN16 in the period PE in response to the Query command. RN16 represents 16-bit random numbers. If the Ack command regarding the RN16 transmitted from the RTF tag 201 is received in the period PF, the RTF tag 201 backscatters response data stored in the RTF tag 201 in the period PG. The response data includes an identifier (ID) for identifying the RTF tag 201.

At this time, if the carrier wave transmitted as the query wave is received, the TTF tag 202 backscatters response data stored in the TTF tag 202 in response to the carrier wave. The response data includes an identifier (ID) for identifying the TTF tag 202.

Figure 4:
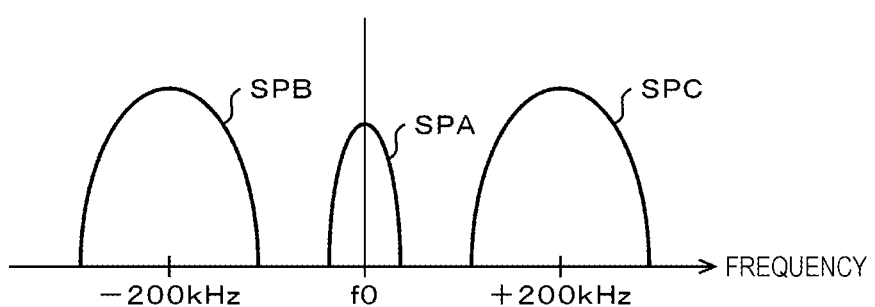
FIG. 4 is a diagram illustrating spectra of response waves from a RTF tag and a TTF tag.

FIG. 4 is a diagram illustrating spectra of the response waves from the RTF tag 201 and the TTF tag 202.

f0 represents a frequency of an unmodulated carrier wave. During the backscatter transmission, the TTF tag 202 reflects the unmodulated carrier wave using the FM0 method while maintaining the frequency thereof as it is. Therefore, the response wave from the TTF tag 202 has a spectrum SPA centering on a frequency f0.

During the backscatter transmission, the RTF tag 201 reflects an unmodulated carrier wave using the mirror subcarrier method while shifting the frequency by ±200 kHz. Therefore, the response wave from the RTF tag 201 has spectra SPB and SPC centering on f0±200 kHz.

The reception signal generated by the antenna 20 in response to the response wave from the RTF tag 201 or the TTF tag 202 is input to the power combiner 23 through the feeder 19 and the antenna duplexer 18. The reception signal is combined with the cancellation signal output from the vector modulator 21 by the power combiner 23 such that the self-interference signals generated by the antenna duplexer 18 and the feeder 19 are reduced. Subsequently, the reception signal is input to the demodulator 24.

In the demodulator 24, the I modulation signal that is inverted and amplified by the inverting amplifier circuit 242 is accumulated to the reception signal by the accumulation circuit 246. In addition, after the phase of the reception signal is shifted by 90 degrees by the phase shifter 241, the Q modulation signal that is inverted and amplified by the inverting amplifier circuit 243 is accumulated to the reception signal by the accumulation circuit 247. The reception signals output from the accumulation circuits 246 and 247 are summed up by the summing circuit 248. As a result, the output of the summing circuit 248 is a signal obtained by demodulating the reception signal that is output from the power combiner 23 with the I modulation signal and the Q modulation signal used for the ASK in the ASK modulator 14. That is, in the demodulator 24, if the reception signal output from the power combiner 23 includes the ASK modulation component, the modulation component is canceled. Thus, the demodulator 24 functions as the cancellation unit or circuit.

Figure 5:
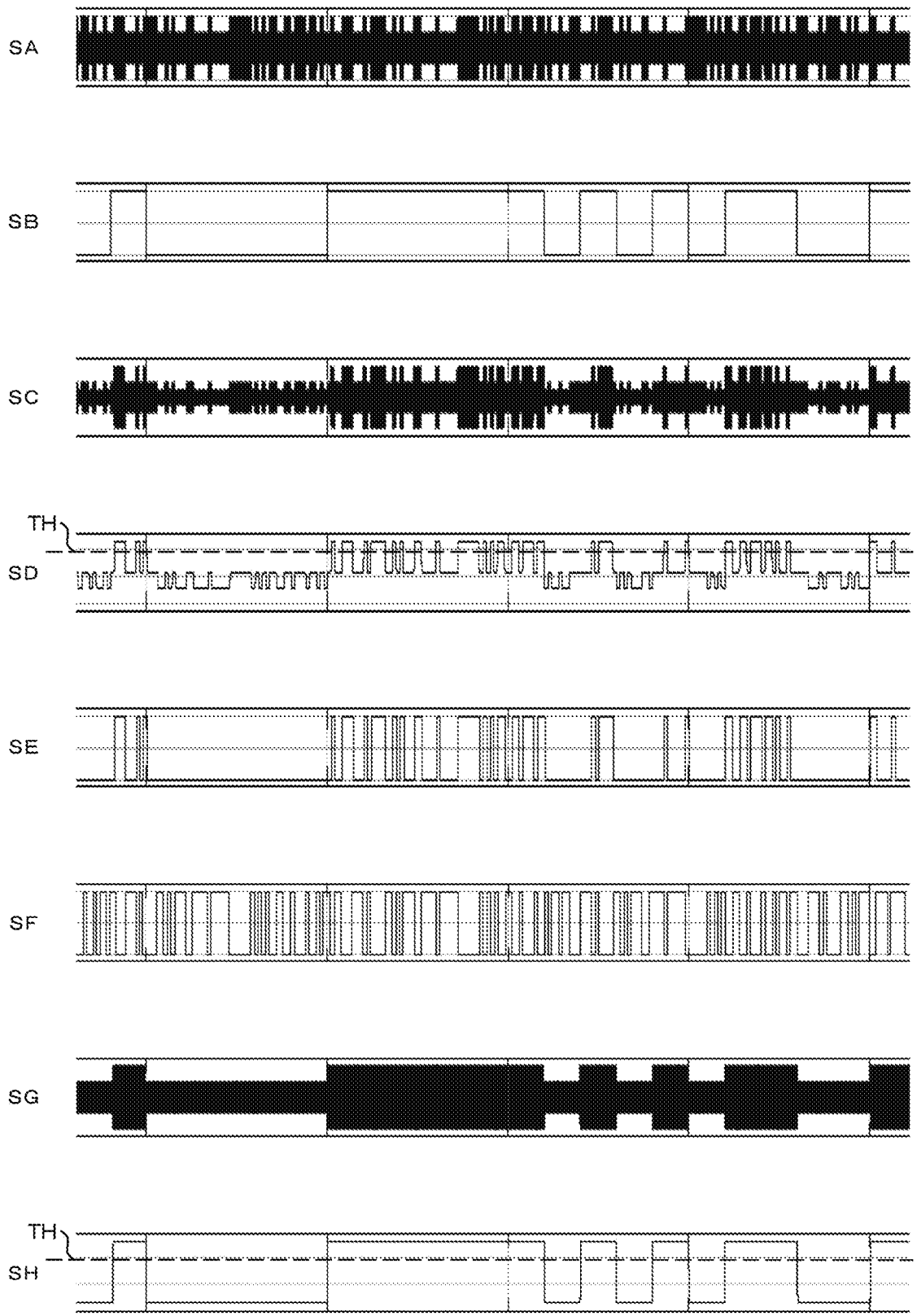
FIG. 5 is a diagram illustrating a state of a change in signal state depending on various processes in the reader apparatus illustrated in FIG. 1.

FIG. 5 is a diagram illustrating a state of a change in signal state depending on various processes in the reader apparatus 100.

A signal SC represents a response wave that is backscattered by the TTF tag 202 for response data representing a signal SB in response to a query wave in a state represented by a signal SA. In the signal SC illustrated in FIG. 5, a change in amplitude by ASK in the query wave and a change in amplitude depending on a change in reflectivity by the response data are mixed, and the amplitude changes in three steps.

The demodulated reception signal is detected by the quadrature detector 25. A component in a frequency band for the mirror subcarrier response is extracted by the BPF 26 from each of the reception baseband signals obtained by the quadrature detector 25. In addition, a component in a frequency band for the FM0 response is extracted by the LPF 29 from each of the reception baseband signals obtained by the quadrature detector 25. Thus, the signal component regarding the response data from the RTF tag 201 is amplified by the VGA 27, is converted into a signal in a digital format by the ADC 28, and is transmitted to the control unit 34. In addition, the signal component regarding the response data from the TTF tag 202 is amplified by the VGA 30, is converted into a signal in a digital format by the ADC 31, and is transmitted to the control unit 34. This way, the BPF 26 and the LPF 29 implement a function as the separation unit or circuit.

The reception baseband signals regarding the RTF tag 201 are squared and summed by the squaring and summing circuit 342, and the reception baseband signals regarding the TTF tag 202 are squared and summed by the squaring and summing circuit 343. Due to the squaring and summation, the signals having the signal levels corresponding to the amplitudes in the response waves are obtained as the output signals of the squaring and summing circuits 342 and 343.

If the RTF tag 201 transmits RN16 and the response data, the query wave is an unmodulated carrier wave, and thus the response wave includes two steps of amplitude variations based on only the response data. In this period, a level variation does not occur in the modulation signal. Therefore, the reception signal is not demodulated by the demodulator 24 and transmits through the demodulator 24 as it is. Thus, if the reception signal is input to the quadrature detector 25, the reception signal is a signal including two steps of amplitude variations based on only the response data from the RTF tag 201. As a result, the output of the squaring and summing circuit 342 is a signal of which the level changes as in the response data from the RTF tag 201. That is, the output of the squaring and summing circuit 342 is binarized with an appropriate threshold by the binarization circuit 344 such that the response data from the RTF tag 201 can be decoded. This way, the squaring and summing circuit 342 and the binarization circuit 344 implement a function as the decoding unit or circuit that decodes the data represented by the response wave transmitted from the RTF tag 201 as the first responder.

As described above, if the TTF tag 202 transmits response data in response to the carrier wave component that is transmitted from the reader apparatus 100 to read the RTF tag 201, the ASK modulation component remains in the response wave in the periods PB, PD, and PF in FIG. 3, and the response wave includes three steps or four steps of amplitude variations as in, for example, the signal SC of FIG. 5. Therefore, unlike the response data, the output of the squaring and summing circuit 343 is a signal of which the level changes in three or more steps as in, for example, a signal SD.

If the signal SD is binarized with a threshold TH, a signal SE is obtained and does not match with the signal SB as the response data. That is, the result of the binarization is not a signal from which the response data can be appropriately decoded.

However, in the embodiment, the response wave such as the signal SC is demodulated with a demodulation signal such as a signal SF such that the reception signal is a signal including only two steps of amplitude variations corresponding to the response data, for example, a signal SG.

Thus, the output of the squaring and summing circuit 343 is a signal including two steps of amplitude variations such as a signal SH, and is binarized with the threshold TH by the binarization circuit 345 such that the signal SB can be accurately decoded. This way, the squaring and summing circuit 343 and the binarization circuit 345 implement a function as the decoding unit or circuit that decodes the data in the response wave transmitted from the TTF tag 202 as the second responder.

As described above, in the reader apparatus 100, if the TTF tag 202 responds while the RTF tag 201 is being read, response data from the TTF tag 202 can be demodulated without error. That is, the RTF tag 201 and the TTF tag 202 can be read at the same time. In a state where both of the RTF tag 201 and the TTF tag 202 are reading targets, the reading efficiency can be improved.

This embodiment can be modified as follows in various ways.

Figure 6:
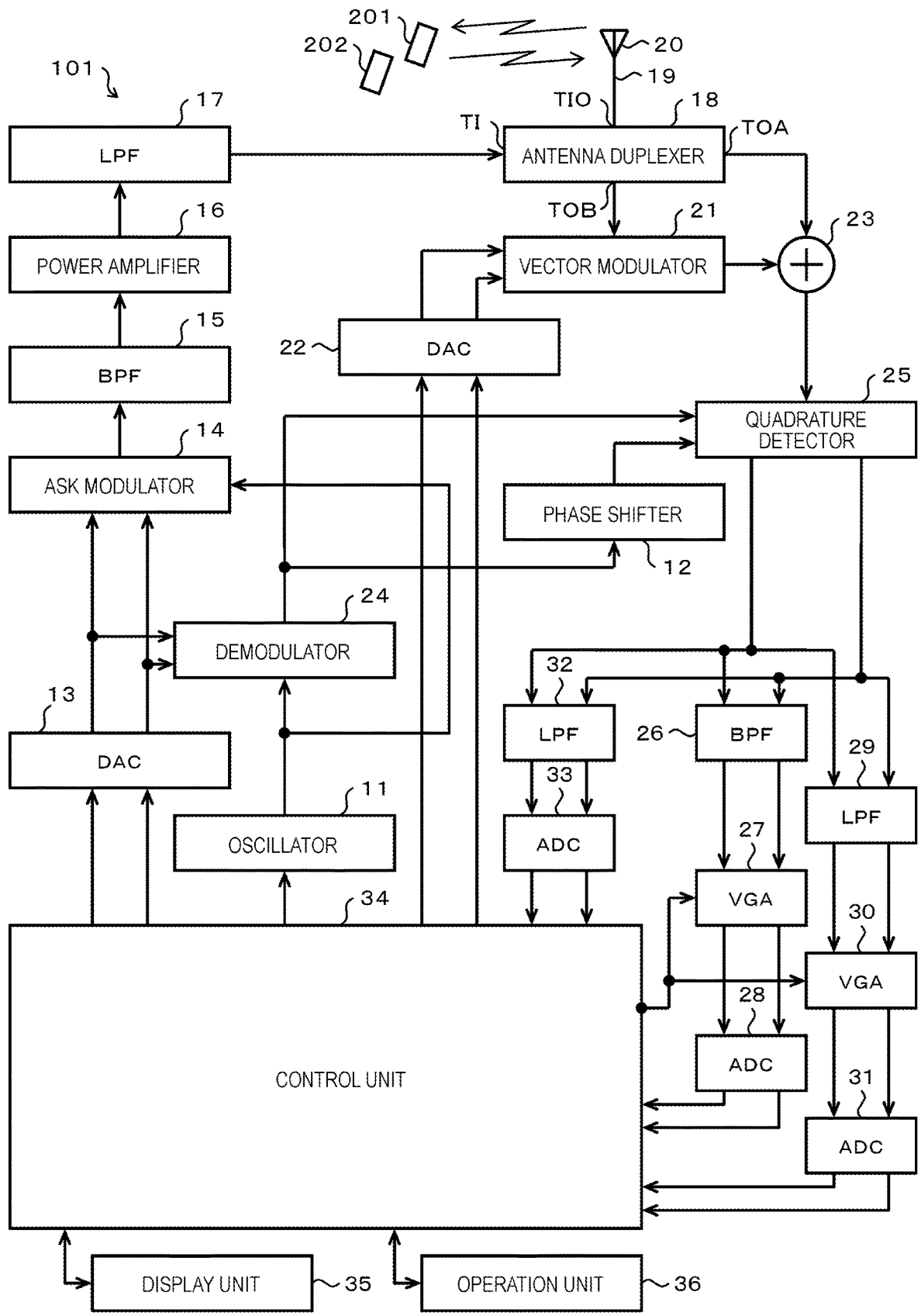
FIG. 6 is a block diagram illustrating a main circuit configuration of a reader apparatus according to a modification embodiment.

FIG. 6 is a block diagram illustrating a main circuit configuration of a reader apparatus 101 according to a modification embodiment.

In FIG. 6, the same components as those of FIG. 1 are represented by the same reference numerals, and the detailed description thereof will not be repeated.

The reader apparatus 101 includes the same components as the reader apparatus 100. It should be noted that the arrangement of the demodulator 24 in the reader apparatus 101 is different from that of the reader apparatus 100.

In the reader apparatus 101, the modulated wave output from the power combiner 23 is input to the quadrature detector 25 as it is. The carrier wave output from the oscillator 11 is input to the demodulator 24. Thus, the demodulator 24 demodulates the carrier wave. The demodulated carrier wave and a carrier wave obtained by shifting the phase of the demodulated carrier wave by 90 degrees by the phase shifter 12 are input to the quadrature detector 25.

With this configuration, the output of the quadrature detector 25 is the same as that of the reader apparatus 100, and the same effect as that of the reader apparatus 100 can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such embodiments or modifications as would fall within the scope and spirit of the inventions.

What is claimed is:

1. A reader apparatus comprising:
    a transmission circuit configured to transmit a query wave that is obtained by modulating a carrier wave with a modulation signal representing a command to be transmitted to a first responder, the first responder being a reader talk first (RTF) tag;
    a cancellation circuit configured to cancel a modulation component corresponding to the modulation signal from a response wave transmitted using a backscattering method from a second responder, the second responder being a tag talk first (TTF) tag; and
    a decoding circuit configured to decode data represented by the response wave from which the modulation component is canceled by the cancellation circuit.

2. The reader apparatus according to claim 1, wherein the cancellation circuit is configured to cancel the modulation component by demodulating a reception signal corresponding to the response wave with the modulation signal.

3. The reader apparatus according to claim 1, wherein the cancellation circuit is configured to cancel the modulation component by removing, from the response wave, a component of a local signal that is obtained by demodulating the carrier wave with the modulation signal.

4. The reader apparatus according to claim 1, wherein the cancellation circuit is configured to cancel a modulation component corresponding to the modulation signal from a reception signal corresponding to a reception wave including a first response wave and a second reception wave, the first response wave being in a first frequency band and transmitted from the first responder in response to the command in the query wave, and the second response wave being in a second frequency band and transmitted from the second responder in response to the query wave, further comprising a separation circuit configured to separate a first signal of a component in the first frequency band and a second signal of a component in the second frequency band from the reception signal from which the modulation component is canceled by the cancellation circuit, and wherein the decoding circuit is configured to decode data represented by the first response wave from the first signal separated by the separation circuit and decode data represented by the second response wave from the second signal separated by the separation circuit.

5. The reader apparatus according to claim 4, wherein the second frequency band is the same as a frequency band of the query wave and the first frequency band is a frequency band that is shifted from the frequency band of the query wave by a predetermined amount.

6. The reader apparatus according to claim 1, wherein the transmission circuit includes at least one of a digital to analog converter (DAC), an amplitude shift keying (ASK) modulator, a band-pass filter (BPF), a power amplifier, a low-pass filter (LPF), an antenna duplexer, an antenna, or an antenna feeder.

7. The reader apparatus according to claim 1, wherein the cancellation circuit includes a demodulator.

8. The reader apparatus according to claim 7, wherein the demodulator includes a phase shifter, a pair of inverting amplifier circuits, a pair of offset addition circuits, a pair of accumulation circuits, and a summing circuit.

9. The reader apparatus according to claim 1, wherein the decoding circuit includes a squaring and summing circuit and a binarization circuit.

10. A method of operation for a reader apparatus, the method comprising:
    transmitting, by a transmission circuit of the reader apparatus, a query wave that is obtained by modulating a carrier wave with a modulation signal representing a command to be transmitted to a first responder, the first responder being a reader talk first (RTF) tag;
    cancelling, by a cancellation circuit of the reader apparatus, a modulation component corresponding to the modulation signal from a response wave transmitted using a backscattering method from a second responder, the second responder being a tag talk first (TTF) tag; and
    decoding, by a decoding circuit of the reader apparatus, data represented by the response wave from which the modulation component is canceled by the cancellation circuit.

11. The method according to claim 10, wherein the cancellation circuit is configured to cancel the modulation component by demodulating a reception signal corresponding to the response wave with the modulation signal.

12. The method according to claim 10, wherein the cancellation circuit is configured to cancel the modulation component by removing, from the response wave, a component of a local signal that is obtained by demodulating the carrier wave with the modulation signal.

13. The method according to claim 10, further comprising:
    cancelling, by the cancellation circuit, a modulation component corresponding to the modulation signal from a reception signal corresponding to a reception wave including a first response wave and a second reception wave, the first response wave being in a first frequency band and transmitted from the first responder in response to the command in the query wave, and the second response wave being in a second frequency band and transmitted from the second responder in response to the query wave;
    separating, by a separation circuit of the reader apparatus, a first signal of a component in the first frequency band and a second signal of a component in the second frequency band from the reception signal from which the modulation component is canceled by the cancellation circuit; and
    decoding, by the decoding circuit, data represented by the first response wave from the first signal separated by the separation circuit and data represented by the second response wave from the second signal separated by the separation circuit.

14. The method according to claim 13, wherein the second frequency band is the same as a frequency band of the query wave and the first frequency band is a frequency band that is shifted from the frequency band of the query wave by a predetermined amount.

\* \* \* \* \*